US012640379B2

(12) United States Patent
Inoue et al.

(10) Patent No.: US 12,640,379 B2
(45) Date of Patent: May 26, 2026

(54) FUEL CELL SYSTEM

(71) Applicant: HONDA MOTOR CO., LTD., Tokyo (JP)

(72) Inventors: Tomoyuki Inoue, Wako (JP); Ryoji Sakai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 572 days.

(21) Appl. No.: 18/123,029

(22) Filed: Mar. 17, 2023

(65) Prior Publication Data

US 2023/0317984 A1    Oct. 5, 2023

(30) Foreign Application Priority Data

Mar. 29, 2022    (JP) ................................. 2022-052682

(51) Int. Cl.
*H01M 8/04* (2016.01)
*H01M 8/04119* (2016.01)
*H01M 8/0432* (2016.01)
*H01M 8/0438* (2016.01)
*H01M 8/04701* (2016.01)
*H01M 8/04746* (2016.01)
*H01M 8/04992* (2016.01)
*H01M 8/10* (2016.01)

(52) U.S. Cl.
CPC ..... *H01M 8/04126* (2013.01); *H01M 8/0432* (2013.01); *H01M 8/04395* (2013.01); *H01M 8/04701* (2013.01); *H01M 8/04761* (2013.01); *H01M 8/04992* (2013.01); *H01M 2008/1095* (2013.01)

(58) Field of Classification Search
CPC ......... H01M 8/04783; H01M 8/04753; H01M 8/04126
See application file for complete search history.

(56) References Cited

U.S. PATENT DOCUMENTS

2019/0319283 A1* 10/2019 Shibata ............. H01M 8/04303

FOREIGN PATENT DOCUMENTS

| JP | 2010-129417 A | 6/2010 |
| JP | 2011-119270 A | 6/2011 |
| JP | 2011-210653 A | 10/2011 |
| JP | 2011-216415 A | 10/2011 |
| JP | 2012-151062 A | 8/2012 |

OTHER PUBLICATIONS

Office Action dated Feb. 6, 2024 issued in the corresponding Japanese Patent Application 2022-052682 with the English machine translation thereof.

* cited by examiner

*Primary Examiner* — Olatunji A Godo
(74) *Attorney, Agent, or Firm* — Carrier, Shende & Associates P.C.; Fulchand P. Shende; Joseph P. Carrier

(57) ABSTRACT

A control device of a fuel cell system controls a temperature adjusting device in a manner that vapor in the oxygen-containing off-gas discharged from a fuel cell stack is saturated.

8 Claims, 3 Drawing Sheets

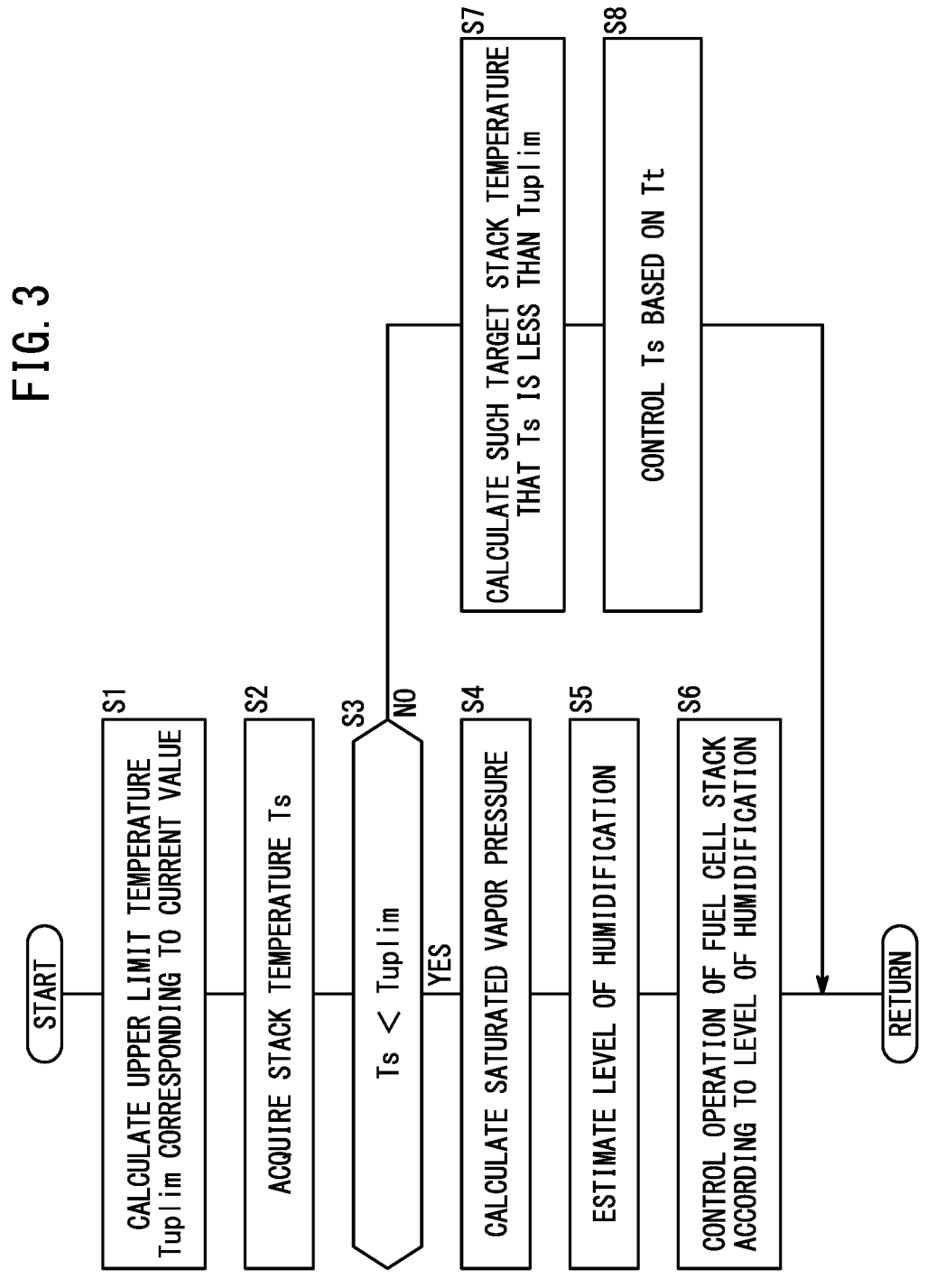

FIG. 3

START

S1 — CALCULATE UPPER LIMIT TEMPERATURE Tuplim CORRESPONDING TO CURRENT VALUE

S2 — ACQUIRE STACK TEMPERATURE Ts

S3 — $Ts < Tuplim$

NO → S7 — CALCULATE SUCH TARGET STACK TEMPERATURE THAT Ts IS LESS THAN Tuplim

S8 — CONTROL Ts BASED ON Tt

YES

S4 — CALCULATE SATURATED VAPOR PRESSURE

S5 — ESTIMATE LEVEL OF HUMIDIFICATION

S6 — CONTROL OPERATION OF FUEL CELL STACK ACCORDING TO LEVEL OF HUMIDIFICATION

RETURN

FUEL CELL SYSTEM

CROSS-REFERENCE TO RELATED APPLICATIONS

This application is based upon and claims the benefit of priority from Japanese Patent Application No. 2022-052682 filed on Mar. 29, 2022, the contents of which are incorporated herein by reference.

BACKGROUND OF THE INVENTION

Field of the Invention

The present invention relates to a fuel cell system to be mounted on a moving object or the like.

Description of the Related Art

In recent years, research and development have been conducted on fuel cells (fuel cell stacks) that contribute to energy efficiency in order to ensure that more people have access to affordable, reliable, sustainable and modern energy.

The fuel cell stack has a plurality of power generation cells stacked one another. The power generation cell includes an electrolyte membrane, a cathode, and an anode. The power generation cell generates electrical power by electrochemical reactions taking place between the oxygen-containing gas supplied to the cathode and the fuel gas supplied to the anode. The oxygen-containing gas is humidified by a humidifier and then supplied to the fuel cell stack. In this way, the electrolyte membrane can be prevented from drying.

JP 2012-151062 A discloses a fuel cell system that can be mounted on a vehicle or the like. In this fuel cell system, an off-gas comes into contact with one surface of the water vapor permeable membrane (electrolyte membrane), and liquid water comes into contact with the other surface of the water vapor permeable membrane. According to this fuel cell system, the temperature of the oxygen-containing off-gas can be lowered by using latent heat generated when the liquid water evaporates. According to this fuel cell system, the temperature of the oxygen-containing off-gas supplied to the humidifier can be optimized, and the oxygen-containing gas can be humidified.

SUMMARY OF THE INVENTION

In order to ensure the humidification performance of the humidifier, it is necessary to know the level of humidification achieved by the humidifier. JP 2012-151062 A does not disclose a method of assessing the level of humidification achieved by the humidifier.

An object of the present invention is to solve the aforementioned problem.

According to an aspect of the present invention, there is provided a fuel cell system including: a fuel cell stack configured to generate electric power using an oxygen-containing gas and a fuel gas; a supply passage through which the oxygen-containing gas flows to be supplied to the fuel cell stack; a discharge passage through which the oxygen-containing off-gas discharged from the fuel cell stack flows; a humidifying device connected to the supply passage and the discharge passage and configured to render the fuel cell stack humidified; a temperature adjusting device configured to adjust a temperature of the fuel cell stack as a stack temperature; a temperature acquiring device configured to acquire the stack temperature; and a control device configured to assess, on a basis of the stack temperature acquired by the temperature acquiring unit, a level of humidification attained to the fuel cell stack by the humidifier, and control the stack temperature through the temperature adjusting device, wherein the control device is configured to control the temperature adjusting device in a manner that vapor in the oxygen-containing off-gas discharged from the fuel cell stack is saturated.

According to the present invention, because the vapor in the oxygen-containing off-gas discharged from the fuel cell stack is saturated, it is not necessary to consider change in the level of humidification of the oxygen-containing off-gas in association with change in the operation state or the like of the fuel cell stack, and it is possible to efficiently know the level of humidification of the oxygen-containing gas attained by the humidifying device. As a result, the level of humidification of the oxygen-containing gas attained by the humidifying device can be appropriately adjusted.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a flowchart showing a procedure of humidification processing.

DETAILED DESCRIPTION OF THE INVENTION

1. Configuration of Fuel Cell System 12

Figure 1:
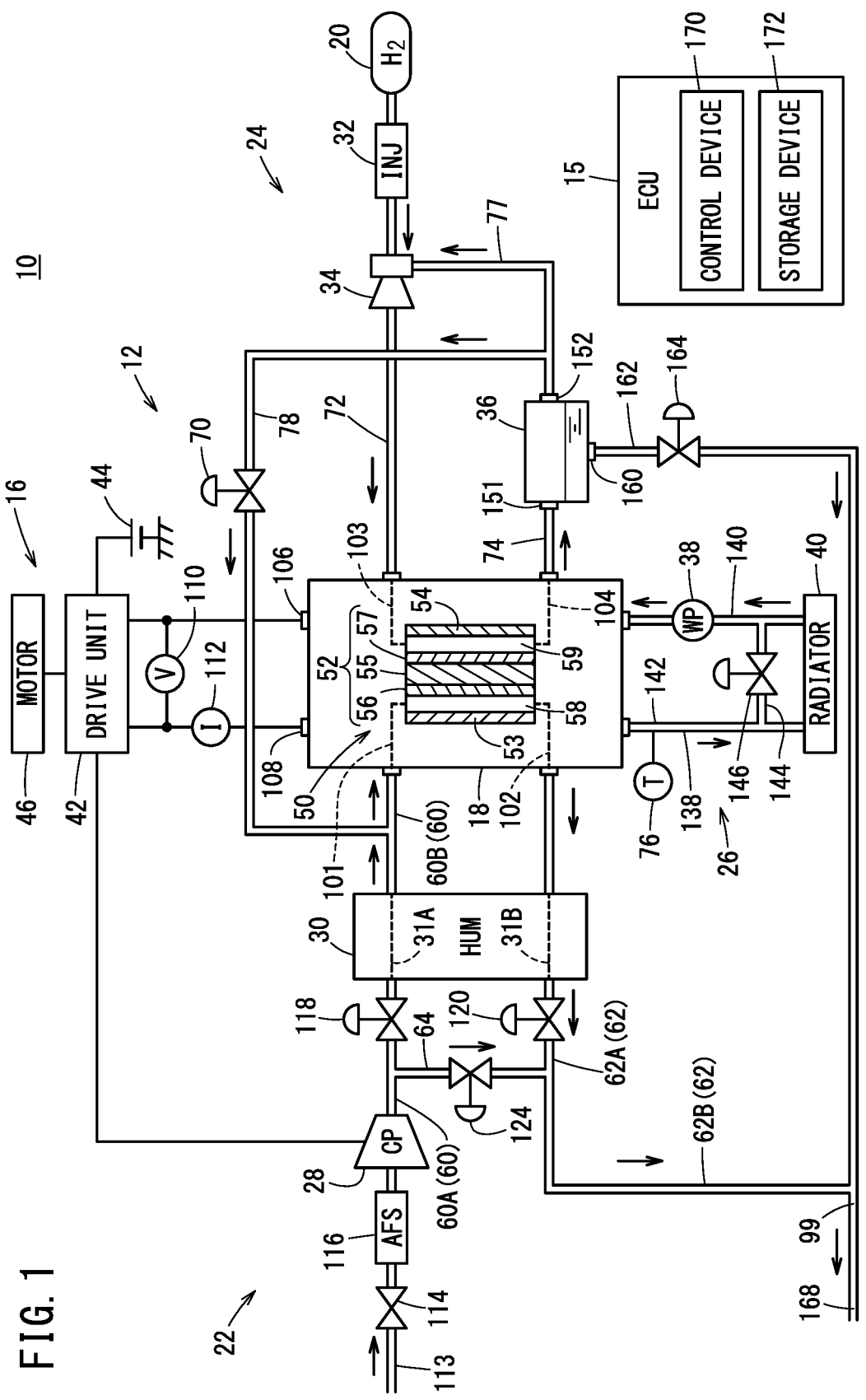
FIG. 1 is a schematic configuration diagram of a fuel cell vehicle, into which a fuel cell system according to the present invention is incorporated.

FIG. 1 is a schematic configuration diagram of a fuel cell vehicle 10, into which a fuel cell system 12 according to the present invention is incorporated. The fuel cell system 12 can be incorporated into any mobile objects such as automobiles, ships, aircrafts, and robots other than the fuel cell vehicle 10. Thus, the fuel cell system 12 contributes to energy efficiency.

The fuel cell vehicle 10 includes a fuel cell system 12, an ECU 15, and an output unit 16. The ECU 15 controls the entire fuel cell vehicle 10. The ECU 15 may be provided as two or more parts instead of one part. The output unit 16 is electrically connected to the fuel cell system 12.

The fuel cell system 12 includes a fuel cell stack 18, a hydrogen tank 20, an oxygen-containing gas supply device 22, a fuel gas supply device 24, and a coolant supply device (temperature adjusting device) 26.

The oxygen-containing gas supply device 22 includes a compressor (CP) 28 and a humidifier (HUM, humidifying device) 30.

The fuel gas supply device 24 includes an injector (INJ) 32, an ejector 34, and a gas-liquid separator 36. The injector 32 may be replaced with a pressure reducing valve.

The coolant supply device 26 includes a coolant pump (WP) 38 and a radiator 40.

The output unit 16 includes a drive unit 42, a high-voltage power storage device 44, and a motor 46. Examples of a load of the drive unit 42 includes not only the motor 46, which is a main device, but also the compressor 28, which is an auxiliary device, and other vehicular auxiliary devices such as an air conditioner. The fuel cell vehicle 10 is driven by the driving force generated by the motor 46.

In the fuel cell stack 18, a plurality of power generation cells 50 are stacked. Each of the power generation cells 50 includes a membrane electrode assembly 52, and separators 53, 54 that sandwich the membrane electrode assembly 52.

The membrane electrode assembly 52 includes a solid polymer electrolyte membrane 55 (simply referred to also as electrolyte membrane 55), a cathode 56, and an anode 57. The electrolyte membrane 55 is formed by impregnating a thin membrane of perfluorosulfonic acid with water, for example. The cathode 56 and the anode 57 sandwich the electrolyte membrane 55. Each of the cathode 56 and the anode 57 has a gas diffusion layer made from carbon paper or the like. An electrode catalyst layer of a platinum alloy supported on porous carbon particles is coated uniformly on the surface of the gas diffusion layer. The electrode catalyst layer is formed on both surfaces of the electrolyte membrane 55, respectively.

A cathode flow field 58 is formed on a surface of one separator 53 facing the membrane electrode assembly 52. The cathode flow field 58 connects an oxygen-containing gas supply passage 101 and an oxygen-containing gas discharge passage 102.

An anode flow field 59 is formed on a surface of the other separator 54 facing the membrane electrode assembly 52. The anode flow field 59 connects a fuel gas supply passage 103 and a fuel gas discharge passage 104.

In the anode 57, by the fuel gas (hydrogen) being supplied, hydrogen ions are generated from hydrogen molecules by electrode reactions caused by catalyst, and the hydrogen ions pass through the solid polymer electrolyte membrane 55 and then move to the cathode 56, while electrons are released from hydrogen molecules.

Electrons released from hydrogen molecules move from a negative terminal 106 to a positive terminal 108 through the loads such as the drive unit 42, the motor 46, and the like, and then to the cathode 56.

At the cathode 56, by action of the catalyst, hydrogen ions and electrons react with oxygen contained in the oxygen-containing gas as supplied, in order to produce water.

A voltage sensor 110 is provided between wiring connecting the positive terminal 108 and the drive unit 42 and wiring connecting the negative terminal 106 and the drive unit 42. The voltage sensor 110 detects a voltage of the fuel cell stack 18 during power generation. Further, a current sensor 112 that detects a current of the fuel cell stack 18 during power generation is provided in wiring connecting the positive terminal 108 and the drive unit 42.

The compressor 28 is constituted by a mechanical supercharger or the like driven by a motor (not shown). The electric power is supplied from the power storage device 44 to the motor of the compressor 28 through the drive unit 42. The compressor 28 has functions such as sucking and pressurizing air from an external air intake 113, and supplying it to the fuel cell stack 18 through the humidifier 30.

The humidifier 30 has a flow path 31A and a flow path 31B. Air (oxygen-containing gas) heated to a high temperature and dried is discharged from the compressor 28 and flows through the flow path 31A. The exhaust gas discharged from the oxygen-containing gas discharge passage 102 of the fuel cell stack 18 flows through the flow path 31B.

Here, the exhaust gas is a wet oxygen-containing off-gas while a bleed valve 70 described later is closed. Further, while the bleed valve 70 is opened, the wet exhaust gas (off-gas) as a mixture of the wet oxygen-containing off-gas and a fuel off-gas pass therethrough.

The humidifier 30 has a function of humidifying the oxygen-containing gas supplied from the compressor 28. That is, the humidifier 30 transfers water contained in the exhaust gas (off-gas) flowing through the flow path 31B to the oxygen-containing gas flowing through the flow path 31A via an internally provided porous membrane to supply a humidified oxygen-containing gas to the fuel cell stack 18.

An oxygen-containing gas supply flow path (supply passage) 60 is provided between the external air intake 113 and the oxygen-containing gas supply passage 101. The oxygen-containing gas supply flow path 60 includes an oxygen-containing gas supply flow path 60A on the upstream side and an oxygen-containing gas supply flow path 60B on the downstream side with respect to a connecting point to a bypass flow path 64 described later. The external air intake 113, a shut-off valve 114, an air flow sensor (AFS) 116, and the compressor 28 are provided in the oxygen-containing gas supply flow path 60A in this order from the upstream side to the downstream side. The oxygen-containing gas supply flow path 60B is provided with a supply-side stop valve 118 and the humidifier 30 in this order from the upstream side to the downstream side. The flow paths such as the oxygen-containing gas supply flow path 60 drawn by double lines are formed by pipes (the same applies to the following description).

The shut-off valve 114 is opened to allow and close to shut off intake of the air into the oxygen-containing gas supply flow path 60.

The air flow sensor 116 measures a flow rate of the oxygen-containing gas supplied to the fuel cell stack 18 through the compressor 28.

The supply-side stop valve 118 opens and closes the oxygen-containing gas supply flow path 60A.

An oxygen-containing gas discharge flow path (discharge passage) 62 is provided between the oxygen-containing gas discharge passage 102 and a merged channel 99. The oxygen-containing gas discharge flow path 62 includes an oxygen-containing gas discharge flow path 62A on the upstream side and an oxygen-containing gas discharge flow path 62B on the downstream side with respect to a connecting point to the bypass flow path 64 described later. In the oxygen-containing gas discharge flow path 62A, the humidifier 30 and a discharge-side stop valve 120 are provided in this order from the upstream side to the downstream side. The discharge-side stop valve 120 also functions as a back pressure valve.

The bypass flow path 64 is provided between an intake of the supply-side stop valve 118 and an outlet of the discharge-side stop valve 120. The bypass flow path 64 connects the oxygen-containing gas supply flow path 60 and the oxygen-containing gas discharge flow path 62. The bypass flow path 64 is provided with a bypass valve 124 that opens and closes the bypass flow path 64. The bypass valve 124 adjusts the flow rate of the oxygen-containing gas bypassing the fuel cell stack 18.

The hydrogen tank 20 is a container including a solenoid shut-off valve, and compresses highly pure hydrogen under high pressure, and stores the compressed hydrogen.

The fuel gas discharged from the hydrogen tank 20 flows through the injector 32 and the ejector 34 that are disposed on a fuel supply flow path 72, and is then supplied to an inlet of the anode flow field 59 of the fuel cell stack 18 through the fuel gas supply passage 103.

An outlet of the anode flow field 59 is connected to a gas supply hole 151 of the gas-liquid separator 36 through the fuel gas discharge passage 104 and a fuel off-gas flow path 74. The fuel off-gas, which is a hydrogen-containing gas, is supplied from the anode flow field 59 to the gas-liquid separator 36.

The gas-liquid separator 36 separates the fuel off gas into gaseous components and liquid components (liquid water). The gas component of the fuel off-gas (fuel exhaust gas) is discharged from a gas discharge hole 152 of the gas-liquid separator 36 and supplied to an intake of the ejector 34 through a circulation flow path 77. On the other hand, when the bleed valve 70 is opened, the fuel off-gas is also supplied to the oxygen-containing gas supply flow path 60B via the connecting flow path 78 and the bleed valve 70.

The liquid component of the fuel exhaust gas flows from a liquid discharge hole 160 of the gas-liquid separator 36 to a drain channel 162 provided with a drain valve 164 as the second on-off valve, is mixed with the exhaust gas discharged from the oxygen-containing gas discharge flow path 62B, and is discharged to the outside air through the merged channel 99 and an outlet 168.

A part of the fuel off-gas (hydrogen-containing gas) is discharged to the drain channel 162 together with the liquid component. In order to dilute the hydrogen gas in the fuel off-gas before discharging it to the outside, a part of the oxygen-containing gas discharged from the compressor 28 is supplied to the oxygen-containing gas discharge flow path 62B through the bypass flow path 64.

The circulation flow path 77 and the oxygen-containing gas supply flow path 60B are connected by the connecting flow path 78. The connecting flow path 78 is provided with the bleed valve 70. When the bleed valve 70 is opened, the fuel off-gas discharged from the fuel cell stack 18 flows to the cathode flow field 58 through the fuel off-gas flow path 74, the gas-liquid separator 36, the circulation flow path 77, the connecting flow path 78, the oxygen-containing gas supply flow path 60B, and the oxygen-containing gas supply passage 101.

The fuel gas in the fuel off-gas flowing through the cathode flow field 58 is ionized into hydrogen ions by catalytic reactions at the cathode 56, and the hydrogen ions react with the oxygen-containing gas to produce water. The remaining unreacted fuel off-gas (composed of nitrogen gas and a small amount of unreacted hydrogen gas) is discharged from the fuel cell stack 18 as the oxygen-containing off-gas, and flows through the oxygen-containing gas discharge flow path 62.

The oxygen-containing off-gas (including the unreacted remaining fuel off-gas) flowing through the oxygen-containing gas discharge flow path 62 is mixed with the oxygen-containing gas supplied through the bypass flow path 64. In this way, the fuel off-gas (including the fuel gas) in the oxygen-containing off-gas is diluted so that the resulting oxygen-containing off-gas in which a concentration of fuel off-gas (including the fuel gas) is lowered flows through the oxygen-containing gas supply flow path 62B.

The oxygen-containing gas discharge flow path 62B merges with the drain channel 162. The oxygen-containing gas discharge flow path 62B and the drain channel 162 communicate with the merged channel 99.

In the merged channel 99, the fuel gas in the mixed fluid of the liquid water and the fuel off-gas discharged from the drain channel 162 is diluted by the oxygen-containing off-gas from the oxygen-containing gas discharge flow path 62B. The diluted gas is discharged to the outside of the fuel cell vehicle 10 through the outlet 168.

The coolant supply device 26 includes a coolant flow path 138 through which the coolant flows. The coolant flow path 138 includes a coolant supply flow path 140, a coolant discharge flow path 142, and a coolant bypass flow path 144. The coolant supply flow path 140 supplies a coolant to the fuel cell stack 18. The coolant discharge flow path 142 discharges the coolant from the fuel cell stack 18. The radiator 40 is connected to the coolant supply flow path 140 and the coolant discharge flow path 142. The radiator 40 cools the coolant. The coolant supply flow path 140 is provided with the coolant pump 38. The coolant bypass flow path 144 is connected to the coolant supply flow path 140 and the coolant discharge flow path 142. The coolant bypass flow path 144 is connected to the coolant supply flow path 140 between the coolant pump 38 and the radiator 40. The coolant bypass flow path 144 is provided with a coolant bypass valve 146 that opens and closes the coolant bypass flow path 144.

A temperature sensor (temperature acquiring device) 76 is provided in the coolant discharge flow path 142. The temperature of the coolant flowing through the coolant discharge flow path 142 correlates with the temperature inside the fuel cell stack 18. In the present embodiment, the temperature of the coolant (coolant outlet temperature) detected by the temperature sensor 76 is detected (acquired) as the temperature inside the fuel cell stack 18. The temperature inside the fuel cell stack 18 is referred to as a stack temperature Ts.

The ECU 15 includes a control device 170 and a storage device 172. The control device 170 includes a processing circuit. The processing circuit may be a processor such as a CPU or the like. The processing circuit may be an integrated circuit such as an ASIC, an FPGA, or the like. The processor is capable of executing various processes by executing programs stored in the storage device 172. At least a portion from among a plurality of processes may be performed by an electronic circuit including a discrete device.

The control device 170 controls the operation of the fuel cell system 12. For example, the control device 170 receives signals transmitted from various sensors. Based on the received detection signals, the control device 170 outputs control signals for controlling the valves, the injector 32, the compressor 28, the coolant pump 38, and the like. The valves, the injector 32, the compressor 28, the coolant pump 38, and the like operate in response to the control signals.

The storage device 172 includes a volatile memory and a non-volatile memory. Examples of the volatile memory include a RAM (Random Access Memory) or the like. The volatile memory is used as a working memory of the processor. In the volatile memory, data and the like required for carrying out processing or computations are temporarily stored therein. Examples of the nonvolatile memory include a ROM (Read Only Memory), a flash memory, and the like. Such a non-volatile memory is used as a storage memory. Programs, tables, and maps, and the like are stored in the non-volatile memory. At least part of the storage device 172 may be provided in the processor, the integrated circuit, etc. as described above.

The non-volatile memory stores a table (or a map) that associates the current of the fuel cell stack 18 during power generation with the upper limit temperature Tuplim. This table is referred to as a first table. The upper limit temperature Tuplim is a temperature at which a state in which the vapor in the off-gas is saturated can be guaranteed. In other words, the upper limit temperature Tuplim is a temperature at which the relative humidity of the off-gas becomes 100% or more, that is, a temperature at which condensation occurs, in the oxygen-containing gas discharge passage 102. The addition, the nonvolatile memory stores a table (or a map) in which the saturated vapor pressure at the fuel cell stack 18 is associated with the level of humidification. This table is referred to as a second table. The nonvolatile memory stores a saturated vapor pressure curve.

2. Operation of Fuel Cell Stack 18 Related to Humidification

As described above, the humidifier 30 humidifies the oxygen-containing gas by moving water in the off-gas discharged from the cathode flow field 58 from the flow path 31B to the flow path 31A. That is, the level of humidification achieved by the humidifier 30 depends on the water content of the off-gas discharged from the fuel cell stack 18. Therefore, the level of humidification achieved by the humidifier 30 can be known by assessing the water content of the off gas. In the present embodiment, as a measure for assessing the water content of the off-gas, the off-gas (vapor) is saturated. More specifically, the off-gas is brought into a state in which condensation occurs.

Figure 2:
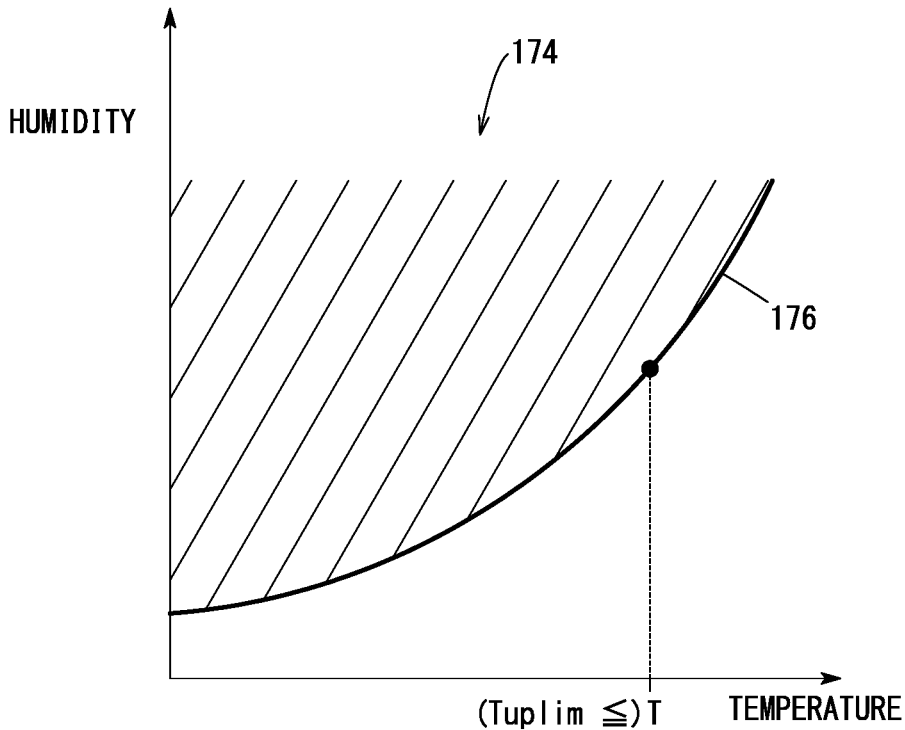
FIG. 2 is a psychrometric chart.

FIG. 2 is a psychrometric chart. In the case where a vapor content of the off-gas is constant, condensation occurs when the temperature of the off-gas enters a temperature region 174 equal to or lower than the dew-point temperature T corresponding to the vapor content. The temperature region 174 is a low-temperature region (including a saturation line 176) with the saturation line 176 as a boundary. In FIG. 2, the temperature region 174 is hatched. The control device 170 controls the temperature of the fuel cell stack 18 so that the temperature of the off-gas becomes equal to or lower than the dew-point temperature T corresponding to the vapor content.

Inside the fuel cell stack 18 the amount of water produced and the amount of power generation correlate with each other. Therefore, in the present embodiment, when acquiring the upper limit temperature Tuplim, the control device 170 uses the current of the fuel cell stack 18 during power generation instead of using an amount of water.

If the vapor content of the off-gas is accurately known, the dew point temperature T can also be accurately determined. However, in the present embodiment, the upper limit temperature Tuplim is estimated on the basis of a current value. This estimation involves uncertainties. Therefore, in order to reliably saturate the vapor in the off-gas, the upper limit temperature Tuplim is preferably set to be lower than the dew point temperature T.

FIG. 3 is a flowchart showing a procedure of humidification process. The control device 170 repeatedly performs the humidification process shown in FIG. 3 during the operation of the fuel cell system 12.

In step S1, the control device 170 calculates the upper limit temperature Tuplim corresponding to the current value. For example, the control device 170 acquires a detection value of the current sensor 112. Further, the control device 170 acquires the upper limit temperature Tuplim corresponding to the detection value of the current sensor 112 by using the first table stored in the storage device 172. The control device 170 may calculate the upper limit temperature Tuplim by using a predetermined arithmetic expression instead of using the first table. When the process of step S1 is completed, the process transitions to step S2.

In step S2, the control device 170 acquires the stack temperature Ts. For example, the control device 170 acquires a detection value of the temperature sensor 76. The detection value of the temperature sensor 76 corresponds to the stack temperature Ts. In the present embodiment, the temperature of the coolant flowing through the coolant discharge flow path 142 is detected as the stack temperature Ts. Instead, the temperature of the off-gas flowing through the oxygen-containing gas discharge flow path 62 between the fuel cell stack 18 and the humidifier 30 may be detected as the stack temperature Ts. Alternatively, the internal temperature of the fuel cell stack 18 may be directly detected as the stack temperature Ts. When the process of step S2 is completed, the process transitions to step S3.

In step S3, the control device 170 compares the upper limit temperature Tuplim acquired in step S1 with the stack temperature Ts acquired in step S2. When the stack temperature Ts is lower than the upper limit temperature Tuplim (step S3: YES), the process proceeds to step S4. In this case, the vapor in the off gas discharged from the fuel cell stack 18 is saturated. On the other hand, when the stack temperature Ts is equal to or higher than the upper limit temperature Tuplim (step S3: NO), the process proceeds to step S7. In this case, the vapor in the off-gas discharged from the fuel cell stack 18 is not saturated.

When the process proceeds from step S3 to step S4, the control device 170 calculates a saturated vapor pressure. For example, the control device 170 acquires the saturated vapor pressure corresponding to the stack temperature Ts by using the saturated vapor pressure curve stored in the storage device 172. When the process of step S4 is completed, the process transitions to step S5.

In step S5, the control device 170 estimates the level of humidification achieved by the humidifier 30. The control device 170 acquires the level of humidification corresponding to the saturated vapor pressure acquired in step S4 by using the second table stored in the storage device 172. The control device 170 may calculate the level of humidification by using a predetermined arithmetic expression instead of using the second table. When the process of step S5 is completed, the process transitions to step S6.

In step S6, the control device 170 controls operation of the fuel cell stack 18 in accordance with the level of humidification achieved by the humidifier 30. For example, when appropriate humidification is achieved by the humidifier 30, the control device 170 may maintain the operation of the fuel cell stack 18. On the other hand, when the level of humidification by the humidifier 30 is insufficient, a dry oxygen-containing gas is supplied to the fuel cell stack 18. As a result, the electrolyte membrane 55 may be dried out. The electrolyte membrane 55 deteriorates due to drying. Therefore, when the level of humidification by the humidifier 30 is insufficient, the control device 170 controls the operation of the fuel cell stack 18 to perform control for suppressing deterioration of the electrolyte membrane 55.

The control device 170 may cool the fuel cell stack 18 as the control for suppressing deterioration of the electrolyte membrane 55. Specifically, the control device 170 may increase the flow rate of the coolant by increasing the rotational speed of the coolant pump 38. Alternatively, the control device 170 may increase the amount of coolant supplied to the radiator 40 by narrowing the opening degree of the coolant bypass valve 146. As the control for suppressing deterioration of the electrolyte membrane 55, the control device 170 may reduce the amount of the oxygen-containing gas supplied to the fuel cell stack 18. Specifically, the control device 170 may decrease the flow rate of the oxygen-containing gas discharged by the compressor 28. The control device 170 may suppress the power generation of the fuel cell stack 18 on a load as the control for suppressing deterioration of the electrolyte membrane 55. Specifically, the control device 170 may limit the rotational speed of the motor 46. When step S6 is executed, the processing of this cycle ends.

When the process proceeds from step S3 to step S7, the control device 170 calculates such a target stack temperature Tt that the stack temperature Ts becomes less than the upper limit temperature Tuplim. For example, the control device 170 may calculate the target stack temperature Tt by subtracting a predetermined temperature from the upper limit temperature Tuplim acquired in step S1. Alternatively, a correspondence relationship between the upper limit temperature Tuplim and the target stack temperature Tt may be determined in advance. When the process of step S7 is completed, the process transitions to step S8.

In step S8, the control device 170 controls the stack temperature Ts on the basis of the target stack temperature Tt. The control device 170 controls the coolant supply device 26 so that the stack temperature Ts becomes equal to or lower than the target stack temperature Tt. For example, the control device 170 may increase the flow rate of the coolant by increasing the rotational speed of the coolant pump 38. Alternatively, the control device 170 may increase the amount of coolant supplied to the radiator 40 by narrowing the opening degree of the coolant bypass valve 146. When step S8 is executed, the processing of this cycle ends.

3. Invention Obtained from Embodiment

The invention understood from the above embodiment will be described below.

The fuel cell system (12) according to an aspect of the present invention includes: the fuel cell stack (18) configured to generate electric power using an oxygen-containing gas and a fuel gas; the supply passage (60) through which the oxygen-containing gas flows to be supplied to the fuel cell stack; the discharge passage (62) through which the oxygen-containing off-gas discharged from the fuel cell stack flows; the humidifying device (30) connected to the supply passage and the discharge passage and configured to render the fuel cell stack humidified; the temperature adjusting device (26) configured to adjust a temperature of the fuel cell stack as a stack temperature (Ts); the temperature acquiring device (76) configured to acquire the stack temperature; and the control device (170) configured to assess, on a basis of the stack temperature acquired by the temperature acquiring unit, a level of humidification attained to the fuel cell stack by the humidifier, and control the stack temperature through the temperature adjusting device, wherein the control device is configured to control the temperature adjusting device in a manner that vapor in the oxygen-containing off-gas discharged from the fuel cell stack is saturated.

According to the configuration described above, because the vapor in the off-gas discharged from the fuel cell stack is saturated, it is not necessary to consider change in the level of humidification of the off-gas in association with change in the operating state or the like of the fuel cell stack, and it is possible to efficiently know the level of humidification of the oxygen-containing gas attained by the humidifying device. As a result, the level of humidification of the oxygen-containing gas attained by the humidifying device can be appropriately adjusted.

In an aspect of the present invention, the temperature acquiring device may acquire the temperature at the outlet (102) of the fuel cell stack positioned upstream of the humidifying device in the discharge passage.

According to the above configuration, the level of humidification inside the fuel cell stack can be appropriately assessed.

In an aspect of the present invention, the control device may set the temperature at which the vapor in the oxygen-containing off-gas is saturated at the outlet of the fuel cell stack as the target stack temperature (Tt) on the basis of the power generation state of the fuel cell stack, and the temperature adjusting device may adjust the stack temperature to be equal to or lower than the target stack temperature.

According to the above configuration, it is possible to control the off-gas to be suitably humidified.

In an aspect of the present invention, the control device may set, as the target stack temperature, the temperature at which the vapor in the oxygen-containing off-gas is saturated at the outlet of the fuel cell stack and at which condensation occurs inside the fuel cell stack or in the exhaust passage, on the basis of the power generation state of the fuel cell stack, and the temperature adjusting device may adjust the stack temperature to be equal to or lower than the target stack temperature.

According to the above configuration, because the off-gas is condensed, even if there is a variation in the power generation state of the fuel cell stack or in the level of humidification achieved by the humidifier, the vapor in the off-gas can be brought into a saturated state. Therefore, the above-described configuration contributes to improvement in receptivity to variation in control.

In an aspect of the present invention, when the stack temperature acquired by the temperature acquiring device is equal to or lower than the target stack temperature, the control device may calculate a saturated vapor pressure from the stack temperature, and acquire the level of humidification attained to the fuel cell stack by the humidifying device, on the basis of the saturated vapor pressure.

According to the above configuration, the humidification state inside the fuel cell stack can be always brought into the saturated vapor state. As a result, the vapor in the off-gas discharged from the cathode flow field inside the fuel cell stack becomes saturated, so that the level of humidification achieved by the humidifier can be easily assessed.

The present invention is not limited to the above disclosure, and various modifications are possible without departing from the essence and gist of the present invention.

The invention claimed is:

1. A fuel cell system comprising:
   a fuel cell stack configured to generate electric power using an oxygen-containing gas and a fuel gas;
   a supply passage through which the oxygen-containing gas flows to be supplied to the fuel cell stack;
   a discharge passage through which the oxygen-containing off-gas discharged from the fuel cell stack flows;
   a humidifying device connected to the supply passage and directly connected to the discharge passage and configured to render the fuel cell stack humidified;
   a temperature adjusting device configured to adjust a temperature of the fuel cell stack as a stack temperature;
   a temperature acquiring device configured to acquire the stack temperature; and
   one or more processors that execute computer-executable instructions stored in a memory, wherein the one or more processors are configured by the computer-executable instructions to cause the fuel cell system to:
   assess, on a basis of the stack temperature acquired by the temperature acquiring unit, a level of humidification attained to the fuel cell stack by the humidifier, and control the stack temperature through the temperature adjusting device, and
   control the temperature adjusting device in a manner that vapor in the oxygen-containing off-gas discharged from the fuel cell stack is saturated.

2. The fuel cell system according to claim 1, wherein the temperature acquiring device acquires a temperature at an outlet of the fuel cell stack positioned upstream of the humidifying device in the discharge passage.

3. The fuel cell system according to claim 2, wherein the one or more processors cause the fuel cell system to: set a temperature as a target stack temperature at which the vapor in the oxygen-containing off-gas is saturated at the outlet of the fuel cell stack, on a basis of a power generation state of the fuel cell stack, and the temperature adjusting device adjusts the stack temperature to be equal to or lower than the target stack temperature.

4. The fuel cell system according to claim 2, wherein the one or more processors cause the fuel cell system to: set a temperature as a target stack temperature at which the vapor in the oxygen-containing off-gas is saturated at the outlet of the fuel cell stack and at which condensation occurs inside the fuel cell stack or in the discharge passage, on a basis of a power generation state of the fuel cell stack, and the temperature adjusting device adjusts the stack temperature to be equal to or lower than the target stack temperature.

5. The fuel cell system according to claim 3, wherein the one or more processors cause the fuel cell system to: set a temperature as the target stack temperature at which the vapor in the oxygen-containing off-gas is saturated at the outlet of the fuel cell stack and at which condensation occurs inside the fuel cell stack or in the discharge passage, on a basis of a power generation state of the fuel cell stack, and the temperature adjusting device adjusts the stack temperature to be equal to or lower than the target stack temperature.

6. The fuel cell system according to claim 3, wherein the one or more processors cause the fuel cell system to:

calculate a saturated vapor pressure from the stack temperature when the stack temperature acquired by the temperature acquiring device is equal to or lower than the target stack temperature, and acquire the level of humidification attained to the fuel cell stack by the humidifying device, on a basis of the saturated vapor pressure.

7. The fuel cell system according to claim 5, wherein the one or more processors cause the fuel cell system to:

calculate a saturated vapor pressure from the stack temperature when the stack temperature acquired by the temperature acquiring device is equal to or lower than the target stack temperature, and acquire the level of humidification attained to the fuel cell stack by the humidifying device, on a basis of the saturated vapor pressure.

8. A fuel cell system comprising:

a fuel cell stack configured to generate electric power using an oxygen-containing gas and a fuel gas;

a supply passage through which the oxygen-containing gas flows to be supplied to the fuel cell stack;

a discharge passage through which the oxygen-containing off-gas discharged from the fuel cell stack flows;

a humidifying device connected to the supply passage and directly connected to the discharge passage and configured to render the fuel cell stack humidified;

a temperature adjusting device configured to adjust a temperature of the fuel cell stack as a stack temperature;

a temperature acquiring device configured to acquire the stack temperature; and one or more processors that execute computer-executable instructions stored in a memory, wherein the one or more processors are configured by the computer-executable instructions to cause the fuel cell system to:

determine whether vapor in the oxygen-containing off-gas discharged from the fuel cell stack is saturated, and in a case where the vapor in the oxygen-containing off-gas is not saturated, control the stack temperature by controlling the temperature adjusting device so as to make the vapor in the oxygen-containing off-gas saturated, and in a case where the vapor in the oxygen-containing off-gas is saturated, perform control in accordance with estimated level of humidification achieved by the humidifying device.

\* \* \* \* \*